(12) United States Patent
Malcolm

(10) Patent No.: US 8,694,753 B2
(45) Date of Patent: *Apr. 8, 2014

(54) DEBUGGING A DYNAMIC MEMORY ALLOCATION USING HEURISTICS RELIABILITY SCORES

(75) Inventor: David Hugh Malcolm, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 256 days.

This patent is subject to a terminal disclaimer.

(21) Appl. No.: 13/174,636

(22) Filed: Jun. 30, 2011

(65) Prior Publication Data

US 2013/0007403 A1 Jan. 3, 2013

(51) Int. Cl.
*G06F 12/00* (2006.01)

(52) U.S. Cl.
USPC .................... 711/171; 711/154; 711/E12.006

(58) Field of Classification Search
None
See application file for complete search history.

(56) References Cited

U.S. PATENT DOCUMENTS

| | | | |
|---|---|---|---|
| 7,292,531 B1* | 11/2007 | Hill | 709/225 |
| 2006/0080385 A1* | 4/2006 | Blandford et al. | 709/203 |
| 2007/0067758 A1* | 3/2007 | Findeisen et al. | 717/140 |
| 2010/0153475 A1* | 6/2010 | Zedlitz et al. | 715/781 |
| 2010/0180179 A1* | 7/2010 | Lastras-Montano | 714/759 |
| 2011/0252180 A1* | 10/2011 | Hendry et al. | 711/165 |

OTHER PUBLICATIONS

Microsoft Corp., "How to use the IIS Debug Diagnostics tool to troubleshoot a memory leak in an IIS process," Microsoft Help and Support, US, Art. 919790, Rev. 3.0, Sep. 22, 2006, retrieved Oct. 27, 2006. <http://support.microsoft.com/kb/919790>.*
Graeme S. Roy, "mpatrol, A Library for Controlling and Tracing Dynamic Memory Allocations," Edition 2.17 for mpatrol version 1.5.1, Dec. 19, 2008, 258 pages.
CCMALLOC, as downloaded on Jun. 30, 2011 from htto://cs.ecs.baylor.edu/~donahoo/tools/ccmalloc/ , 1 page.
Armin Biere, "USAGE," V 1.3, Dec. 4, 2001 as downloaded on Jun. 30, 2011 from http://cs.ecs.baylor.edu/~donahoo/tools/ccmalloc/USAGE , 1 page.
Sanjay Ghemawat, Google Heap Profiler, modified on May 7, 2010, as downloaded on Jun. 30, 2011 from http://google-perftools.googlecode.com/svn/trunk/doc/heapprofile.html , 3 pages.
Mario Hewardt, "Advanced .NET Debugging: Managed Head and Garbage Collection," Nov. 18, 2009, 50 pages.
Klaus Salchner, "SOS from Your Production Environment," Apr. 11, 2005, 12 pages.
SOS.dll (SOS Debugging Extension), as downloaded on Jun. 30, 2011 from http://msdn.microsoft.com/en-us/library/bb190764.aspx, 10 pages.

(Continued)

*Primary Examiner* — Matthew Bradley
*Assistant Examiner* — Daniel Bernard
(74) *Attorney, Agent, or Firm* — Lowenstein Sandler LLP

(57) ABSTRACT

A computing system determines whether memory data pertaining to a block of dynamically allocated memory within an inferior process memory space satisfies one or more criteria in heuristics data. The computing system identifies a category to assign to the block of dynamically allocated memory based on the determination of whether the memory data satisfies the criteria and generates a reliability score for the block of dynamically allocated memory indicating a level of reliability of the identified category. The computing system categorizes the block of dynamically allocated memory based on a comparison of the reliability score and a previous reliability score of the block of the dynamically allocated memory.

20 Claims, 6 Drawing Sheets

(56) References Cited

OTHER PUBLICATIONS

Karim Yaghmour, Building Embedded Linux Systems, Chapter 11, Section 11.4 Memory Debugging, as downloaded on Jun. 30, 2011 from http://www.eduunix.ccut.edu.en/index/html/linux/O'Reilly%20-%20Building%20Embedded%20Linux%20Systems/belinuxsys-CHP-11-SECT-4.html, 7 pages.

* cited by examiner

DEBUGGING A DYNAMIC MEMORY ALLOCATION USING HEURISTICS RELIABILITY SCORES

RELATED APPLICATION

The present application is related to co-filed U.S. patent application Ser. No. 13/174,646 entitled "Using Symbol Information for Categorization of Dynamic Memory Allocations" and U.S. patent application Ser. No. 13/174,651 entitled "Using Heuristics for Field Types of a Structure to Categorize Dynamic Memory Allocations", which are assigned to the assignee of the present application.

TECHNICAL FIELD

Embodiments of the present invention relate to debugging memory. Specifically, the embodiments of the present invention relate to debugging a dynamic memory allocation using heuristics reliability scores.

BACKGROUND

Dynamic memory allocation is the allocation of memory (e.g., random access memory (RAM)) for use in a user program during the run-time of that program. Memory is typically allocated from a large pool of an unused memory area, known in the art as the heap. A user, such as a software programmer, a software developer, and a system administrator, can execute a program and may notice that the program is running at a speed slower than expected and/or that the program is using significantly more dynamically allocated memory than expected. The user may wish to debug how the heap is being used by the program and to help identify how the performance of a program can be optimized.

Conventional solutions for debugging dynamic memory allocations may use heuristics to categorize memory at a very high-level and generally do not furnish results that provide any value to a user. Traditional solutions do not deduce information to categorize how a program uses the dynamically allocated memory in great detail.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for debugging a dynamic memory allocation using heuristics reliability scores. A computing system determines whether memory data pertaining to a block of dynamically allocated memory within an inferior process memory space satisfies one or more criteria in heuristics data. The computing system identifies a category to assign to the block of dynamically allocated memory based on the determination of whether the memory data satisfies the criteria and generates a reliability score for the block of dynamically allocated memory indicating a level of reliability of the identified category. The computing system categorizes the block of dynamically allocated memory based on a comparison of the reliability score and a previous reliability score of the block of the dynamically allocated memory.

Embodiments of the present invention categorize blocks of dynamically allocated memory at a level of detail to provide users, such as a software programmer, with valuable data to optimize the performance of a program. Embodiments provide a level of detail by improving an analysis of the dynamically allocated memory based on reliability scores that are assigned to the analyses.

Figure 1:
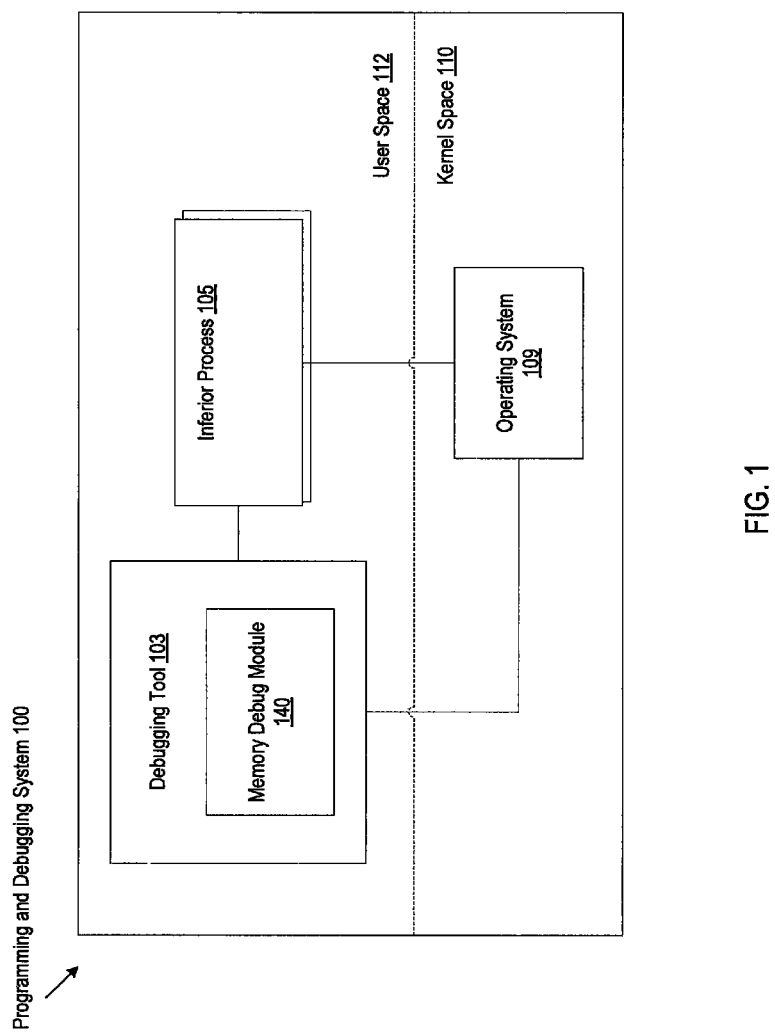
FIG. 1 illustrates an exemplary programming and debugging environment in which embodiments of the present invention may operate.

FIG. 1 illustrates an exemplary programming and debugging system 100 for debugging a dynamic memory allocation using heuristics reliability scores in accordance with some embodiments of the invention. The programming and debugging system 100 can be hosted by a computer system (e.g., a server, client, workstations, desktop, tablet, one or more small protable platforms, such as a notebook, a PDA (personal digital assistant), or wireless web devices, and other devices. An exemplary computer system is described in greater detail below in conjunction with FIG. 6.

System 100 includes memory that can be divided into regions, such as user space 112 and kernel space 110. The kernel space 110 is reserved for running an operating system 109 (e.g., Linux® OS, Windows® OS, etc.). The user space 112 is reserved for running user mode programs including program processes 105. A program is a set of instructions that can be executed by one or more processors and a program process 105 is an instance of a program that is being executed, with a memory area for its own random-access storage. This is typically implemented using "virtual memory" by an operating system 109, and known as the "address space" of the process 105. A program process 105 is hereinafter referred to as an inferior process. A debugger process is able to take control of an inferior process 105, and, in particular, read the data stored in the memory area of the inferior process 105 into its own memory area.

A user, such as a software programmer, a software developer, a system administrator, can execute a program, which can include execution of one or more inferior processes 105, for example, by using a programming tool. Examples of a programming tool include tools for programming in Java, Perl, Python, Ada, C, C++, FreeBASIC, FreePascal, Fortran, etc. An operating system 109 can statically allocate memory for an inferior process 105 at compile time before the associated inferior process 105 is executed, and can dynamically allocate memory for use in an inferior process 105 during the runtime of that inferior process 105. The memory can be allocated from an area of memory, known in the art as the heap.

A memory debug module 140 can be an extension module running with a debugging tool 103. The programming and debugging system 100 hosts a debugging tool 103 in the user space 112 to allow a user to debug the dynamically allocated areas of memory within the inferior process 105. For example, an inferior process 105 may be running and a user may notice that the inferior process 105 is executing at a speed slower than expected and/or that the inferior process 105 is using significantly more dynamically allocated memory than expected. The user can execute the debugging tool 103 to categorize the dynamically allocated areas of memory within the inferior process 105 and identify how the performance of a program executing the inferior process 105 can be optimized. An example of a debugging tool 103 is the GNU Debugger (GDB) for the GNU operating system. The kernel space 110 can include a kernel source level debugger (not shown), such as KGDB for the Linux® operating system, which allows for debugging of the host Linux® kernel through GDB.

The memory debug module 140 can use heuristics data for the inferior process 105 to generate reliability scores for blocks of dynamically allocated memory to categorize the dynamically allocated areas of memory within an inferior process 105. The heuristics data can include one or more criteria for categorizing dynamically allocated memory and data that describes, for example, how a program object is implemented at the machine code level. The criteria can be implemented as code. In one embodiment, the criteria is implemented as bytecode.

An external debugger process can read in collections of bytes from the inferior process 105 and determine the best interpretation of each of the collections of bytes. Given a buffer of bytes from the inferior process 105 and a set of different possible interpretations, the memory debug module 140 can determine which of the interpretations are valid interpretations of the bytes. The memory debug module 140 can use the reliability scores to determine which of the interpretations is the best interpretation and categorize the allocations of the bytes from the inferior process.

The debugging tool 103 can attach to the inferior process 105 and execute an external debugger process, which is a process that is separate from the inferior process 105 and has a debugger process memory space that is separate from the inferior process 105 memory space. Using an external debugger process that is separate from the inferior process 105 allows a user to debug the dynamic memory allocation without having to reconfigure a programming and debugging system 100 ahead of time.

Figure 2:
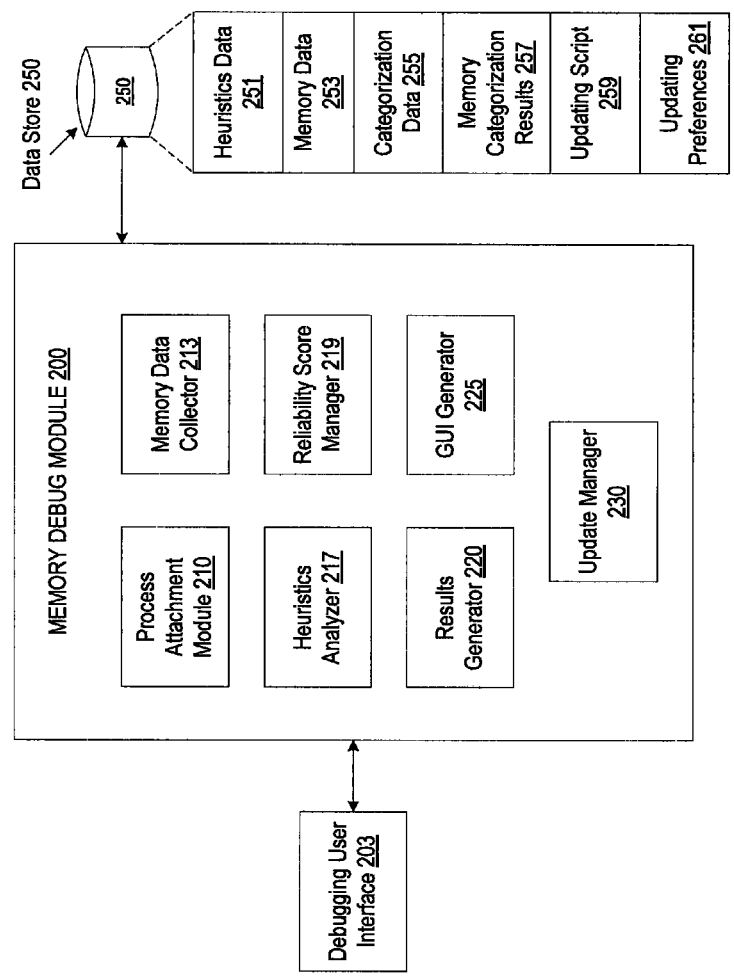
FIG. 2 is a block diagram of one embodiment of a memory debug module for debugging a dynamic memory allocation using heuristics reliability scores.

FIG. 2 is a block diagram of one embodiment of a memory debug module 200 for categorizing dynamic memory allocations using heuristics reliability scores. The memory debug module 200 may be the same as the memory debug module 140 in the system 100 of FIG. 1. The memory debug module 200 includes a process attachment module 210, a memory data collector 213, a heuristics analyzer 217, a memory labeling module 215, a reliability score manager 219, a results generator 220, a graphical user interface (GUI) generator 225, and an update manager 230.

In one embodiment, the memory debug module 200 is coupled to a data store 250 that stores heuristics data 251. The heuristics data 251 can include one or more criteria for categorizing the dynamically allocated memory. Heuristics can be implemented as code or data within the debugger process which categorize the block of memory. For example, there are many different interpretations of what the ones and zeroes "mean." The memory debug module 200 is looking to find the best interpretation, taking a reasonable amount of time in which to do it. It is possible for a given heuristic to get the wrong answer, thus the memory debug module 200 is looking for heuristics that quickly give correct results on real world data, achieving an acceptable ratio of true results to false results, and of categorized blocks to uncategorized blocks.

Examples of heuristic data 251 can include are not limited to, heuristics criteria pertaining to the implementation details of various data types for a particular programming language, heuristics criteria pertaining to whether a block of dynamically allocated memory corresponds to a structure, and heuristics criteria pertaining to the initial word of a block of dynamically allocated memory. For example, the data store 250 can store heuristics data 251 for the C programming language that describes how the C programming language implements strings in memory at the machine code level (as NULL-terminated buffers of bytes in some encoding, such as ASCII). In another example, heuristics data 251 can include a definition of how the Python programming language implements Python objects in memory at the machine code level.

A user can execute a debugging tool, such as GDB (GNU Debugger), to debug dynamic memory allocations. The process attachment module 210 can identify a process identifier (process ID) of an inferior process and can use the process ID to attach the debugging tool to the inferior process, which invokes an external debugger process to debug the dynamically allocated memory that is within the inferior process memory space. The process ID may also be supplied directly by user input. For example, the user may run a program named "top" to see the most memory-consuming processes on the system, notice something he/she was not expecting, and identify the process ID from that program's textual output. An operating system can provide system calls which the process attachment module 210 can use to directly access the address space of the inferior process, and read and write bytes of memory in the address space of the inferior process.

The memory data collector 213 can iterate through the blocks of dynamically allocated memory (e.g., RAM) within the inferior process memory space that are of interest and collect data about the blocks of memory (memory data 253). Examples of memory data 253 include memory addresses, an address range for the block or bytes of memory, an initial word for the memory, a size for a block of memory, data indicating whether memory contains a pointer, etc. The memory data 253 can be stored in a data store 250 that is coupled to the memory debug module 200.

The heuristics analyzer 217 can examine an inferior process to determine its programming language and can identify which heuristics data 251 corresponds to the program process. For example, the heuristics analyzer 217 can examine an inferior process, determine it is a Python program, and can identify heuristics data 251 that describes how Python implements objects at a machine code level. The heuristics analyzer 217 can also receive user input of a selection of which heuristics data 251 is to be used for the inferior process via a debugging user interface 203.

The heuristics analyzer 217 can determine whether the memory data 253 pertaining to a particular block of memory satisfies the heuristics data 251 for the inferior process to categorize the block of memory accordingly. The heuristics analyzer 217 can follow pointers in the subset of bytes to examine other blocks of memory. In one embodiment, when the memory data 253 for a block of memory does not satisfy the heuristics criteria 251, the heuristics analyzer 217 can assign the category 'uncategorized' or 'unknown' to the block of dynamically allocated memory. When the memory data 253 for a block of memory satisfies the heuristics criteria 251, the heuristics analyzer 217 can identify a category to assign to the block based on the suggested category in the heuristics data 251.

The reliability score manager 219 can generate a reliability score for the block based on the identified category. The reliability score can indicate a level of detail or accuracy of the identified category for the block of dynamically allocated memory. One example of a reliability score can include, and is not limited to, a number value. For example, the greater the number value, the better the reliability score and categorization. The heuristics analyzer 217 can make multiple attempts to categorize the same blocks of dynamically allocated areas of memory within an inferior process memory space. When a block of dynamically allocated memory has already been categorized, a subsequent attempt can lead to a better or more accurate categorization of the same block of memory.

The heuristics analyzer 217 can compare the current reliability score for a block of dynamically allocated memory to a previous reliability score for the block to determine which is the better score. In one embodiment, the heuristics analyzer 217 initially assigns a default reliability score to each block of dynamically allocated memory. The default reliability score can be a zero value. In one embodiment, a better score is the score that has the greater value. The heuristics analyzer 217 can assign a category, which corresponds to the reliability score that has the greater value, to the block. The heuristics analyzer 217 can store categorization data 255 that indicates the category and reliability score for a block or byte of memory in the data store 250. The categorization data 255 can be stored within the debugger process memory space. For example, the heuristics analyzer 217 may categorize a block of memory as a Python object and store categorization data 255 that indicates the reliability score for the particular block of memory and the category of 'Python object' for the particular block of memory. The categorization data 255 can also include the address of the dynamically allocated memory.

The results generator 220 can generate memory categorization results 257 based on the categorization data 255 for the dynamically allocated memory. Examples of memory categorization results 257 include backtraces, snapshots of the state of the program process dynamic memory, a history of the snapshots, data showing the differences between the states, data that identifies buffer overflow, etc. The results generator 220 can receive user input, via a debugging user interface 203 that is coupled to the memory debug module 200, that identifies which memory categorization results 257 to generate. The debugging user interface 203 can be a graphical user interface. The graphical user interface (GUI) generator 225 can generate a GUI displaying the memory categorization results 257 to a user via the debugging user interface 203. The memory categorization results 257 can be stored in the data store 250. The memory categorization results 257 can be stored within the debugger process memory space, unlike traditional solutions that store data, such as backtraces, within the program process memory space.

In one embodiment, the results generator 220 stores the memory categorization results 257 in a cache that is coupled to the memory debug module 200. The update manager 230 can run an updating script 259 that is stored in the data store 250 to detect when information changes within the inferior process that is attached to a debugging tool and update the memory categorization results 257 to reflect the changes. The update manager 230 can periodically run the updating script 259 based on user input (e.g., every minute until the debugging tool is detached from the program process). The user input can be received via the debugging user interface 203 and can be stored as update preferences 261 in the data store 250.

A data store 250 can be implemented on a main memory or other data storage device, such as disks, network storage, and virtual memory. A data store 250 can be a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set', as used herein, refers to any positive whole number of items.

Figure 3:
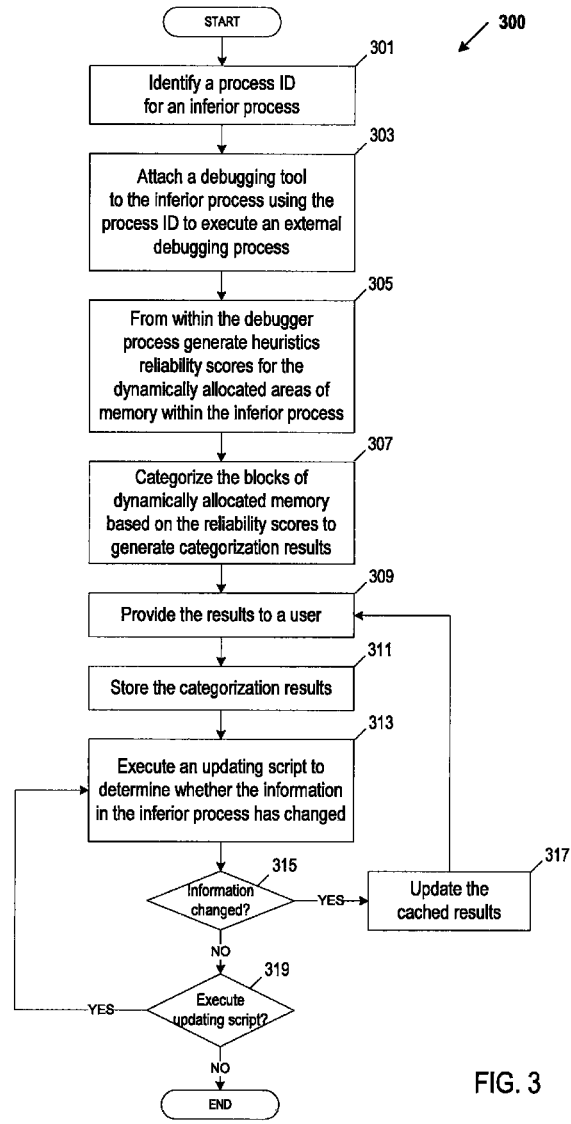
FIG. 3 is a flow diagram of an embodiment of a method for debugging a dynamic memory allocation using heuristics reliability scores.

FIG. 3 is a flow diagram of an embodiment of a method 300 for debugging a dynamic memory allocation using heuristics reliability scores. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the memory debug module 140 in the programming and debugging system 100 of FIG. 1.

At block 301, the memory debug module identifies the process ID for the inferior process and uses it to attach the debugging tool to the inferior process at block 303. The memory debug module executes an external debugger process to debug the dynamically allocated areas of memory within the inferior process memory space. At block 305, the memory debug module, from within the external debugger process, generates heuristics reliability scores for the blocks of dynamically allocated areas of memory within the inferior process. Embodiments of generating heuristics reliability scores for the blocks of dynamically allocated areas of memory within the inferior process are described in greater detail below in conjunction with FIG. 4 and FIG. 5.

At block 307, the memory debug module categorizes the blocks of dynamically allocated memory based on the heuristics reliability scores for the blocks of dynamically allocated memory and generates categorization results. Embodiments of categorizing the blocks of dynamically allocated memory using the heuristics reliability scores are described in greater detail below in conjunction with FIG. 4 and FIG. 5. Examples of memory categorization results can include, and are not limited to, backtraces that provide data indicating why a dynamic memory allocation occurred, snapshots of the state of the program process dynamic memory, a history of the snapshots, data showing the differences between the states, data that identifies buffer-overflow, a history of iterations, etc. The memory debug module can receive user input identifying which memory categorization results to generate.

At block 309, the memory debug module provides the memory categorization results to the user. The memory categorization results can be provided to a user via an output device, such as a display device, printer, etc. The memory debug module can generate a GUI that includes the memory categorization results and display the GUI to show a user the categorization of the dynamically allocates areas of memory within the inferior process. In one embodiment, the memory debug module displays the GUI in parallel with the inferior process execution. In another embodiment, the memory debug module displays the GUI subsequent to the inferior process execution. One example of memory categorization results is provided as follows:

| Category | Count | Allocated Size |
| --- | --- | --- |
| string data | 1,944 | 94,432 |
| python str | 85 | 52,752 |
| python dict | 164 | 47,600 |

-continued

| Category | Count | Allocated Size |
|---|---|---|
| python type | 1 | 1,824 |
| python tuple | 3 | 1,232 |
| TOTAL | 2,197 | 197,840 |

The above example is an example of a category-by-category report on the dynamically allocated areas of memory within an inferior process. A user can use a category-by-category report to locate which aspects of an inferior process are occupying the bulk of memory, and which aspects of the inferior process may be the best targets for optimization work.

Another example of memory categorization results is provided as follows:

```
0x000000000060a1c0 -> 0x000000000060a28f    208 bytes    string
data |2f 68 6f 6d 65 2f 64 61 76 69 64 2f 63 6f 64 69 6e 67 2f 68
65 61 70 3a 2f 75 73 72 2f 6c 69 62
|/home/david/coding/heap:/usr/lib|
0x000000000060a290 -> 0x000000000060ae9f    3088 bytes
uncategorized data |00 00 00 00 00 00 0000 00 00 00 00 00 00 00
00 00 00 00 00 00 00 00 00 81 a8 ab 2f 15 0b b1 01
|.............../..|
```

The example above is an example of a memory dump report in a hex dump form that shows all of the memory chunks. A memory dump report can provide a user additional clues into how memory is being used by a program process.

At block 311, the memory debug module stores the memory categorization results within the debugger process memory space, or on a backing store, such as disk (e.g. a SQLite database). Whereas, traditional memory debugging solutions store results, such as backtraces, within the memory space for the inferior process itself. In one embodiment, the memory debug module stores the memory categorization results in a cache memory and stores an updating script in a data store for updating the cached results. At block 313, the memory debug module runs an updating script to detect whether information within the inferior process that is attached to the debugging tool has changed. If the information has changed in the inferior process (block 315), the memory debug module updates the cached memory categorization results to reflect the change at block 317, and returns to block 309 to provide the updated results to a user.

At block 319, the memory debug module determines whether to execute the updating script again. The memory debug module can periodically execute the updating script based on user input. If the user input indicates that the updating script is to be executed, the memory debug module returns to block 313 to execute the updating script.

Figure 4:
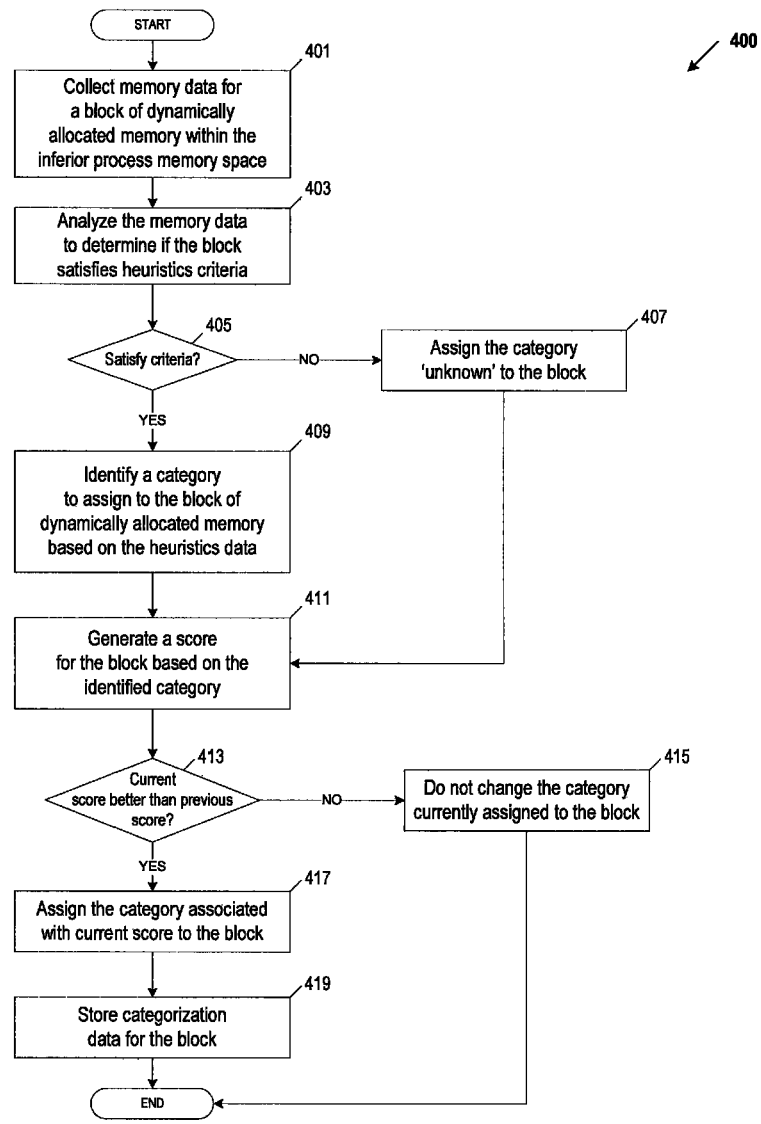
FIG. 4 is a flow diagram of an embodiment of a method for categorizing the dynamically allocated areas of memory within an inferior process using heuristics reliability scores.

FIG. 4 is a flow diagram of an embodiment of a method 400 for categorizing the dynamically allocated areas of memory within an inferior process using heuristics reliability scores. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the memory debug module 140 in the programming and debugging system 100 of FIG. 1. In one embodiment, the method 400 starts with execution of a debugging tool to debug the dynamically allocated areas of memory within an inferior process.

At block 401, the memory debug module collects memory data for a block of dynamically allocated memory within the inferior process memory space. Examples of memory data include memory addresses, an address range for the block or bytes of memory, an initial word for the memory, a size for a block of memory, data indicating whether memory contains a pointer, etc. At block 403, the memory debug module analyzes the memory data to determine if the block satisfies heuristics criteria that is stored in a data store that is coupled to the memory debug module.

For instance, one example of a heuristic, with the C programming language, is that strings are implemented as a series of bytes with a 0 value terminating the sequence. Within many typical C programs, the strings are encoded in ASCII, and the values of the bytes are in the range 9-127 (out of the full range 0-255) before reaching the 0 byte. The memory debug module can collect memory data for the block of dynamically allocated memory, such as the values from the inferior process for the block, read the values, and if all of the bytes are in the range 9-127 before a 0 byte, the heuristics can suggest that the bytes can be categorized as a NULL-terminated string.

In another example, the heuristics criteria can be based on the initial word of a block of memory. For instance, the heuristics data for the C++ programming language can describe criteria that if an initial word of the memory within the inferior process memory space is a pointer to within the "data" segment of a library, and the pointer is of a C++ vtable, then the block of memory can be categorized as a C++ object of that C++ class.

If the memory data for the block of dynamically allocated memory does not satisfy the heuristics criteria (block 405), the memory debug module assigns a category, such as 'unknown' or 'uncategorized,' to the block according to one embodiment at block 407. If the memory data for the block satisfies the criteria described by the heuristics data (block 405), the memory debug module identifies a category as suggested by the heuristics data to assign to the block of dynamically allocated memory at block 409. For example, if the bytes of the particular block of memory are within a range of range 9-127 bytes (out of the full range 0-255) before reaching a 0 byte, and the memory debug module categorizes the particular block of memory as a NULL-terminated string.

At block 411, the memory debug module generates a heuristics reliability score for the block of dynamically allocated memory based on the identified category. The reliability score can indicate the level of detail or accuracy of the categorization of the block of dynamically allocated memory. One example of a reliability score can include, and is not limited to, a number value. For example, the greater the number value, the better the categorization. For instance, a block of dynamically allocated data that is labeled as 'uncategorized' can have a zero reliability score. The memory debug module can make multiple attempts to categorize the same blocks of dynamically allocated areas of memory within an inferior process. When a block of dynamically allocated memory has already been categorized, a subsequent attempt can lead to a better or more accurate categorization of the same block of memory based on a comparison of the reliability scores.

At block 413, the memory debug module determines whether the current reliability score for the block is better than a previous reliability score of the block. In one embodiment, the memory debug module initially assigns a default reliability score to each block of dynamically allocated memory. The default reliability score can be a zero value. In one embodiment, a better score is the score that has the greater value.

For example, within CPython, a PyDictObject can be used to store a mapping from keys to values (called a "dictionary" or just "dict"), and the PyDictObject dynamically allocated to block_A by a Python allocator. The Python allocator also allocates an optional second dynamic allocation to block_B to act as a buffer used for implementation details. However, block_A can also be used for the more specialized purpose of storing the attributes of a dynamically allocated block_C which is an instance of a Python class_D. A user is likely to be most interested in categorization results that include the memory usage with respect to the Python classes in their program, rather than categorization results that report that the program merely uses lots of dictionaries. If the memory debug module encounters block_A before it encounters block_C, the memory debug module may categorize block_A merely as of type "PyDictObject" and categorize block_B merely as of type "PyDictObject internal buffer". When the memory debug module later encounters block_C, it can identify the name of the class_D, identify that block_A is the attribute dictionary for block_C, and go back to block_A and block_B and recategorize them as "attributes of a class_D" and "buffer for attributes of a class_D" respectively, giving these categorizations a higher reliability score than the scores of the original categorizations. The memory debug module can thus provide a more meaningful report to the user than if the scoring system was not used.

If the current reliability score is not better than the previous reliability score (block 413), the memory debug module does not change the category that is currently assigned to the block at block 415. If the current reliability score is better than the previous reliability score (bock 413), the memory debug module assigns the category that is associated with the current score to the block at block 417. At block 419, the memory debug module stores the category assignment and the reliability score as part of categorization data in the data store. The categorization data can be stored within a debugger process memory space. The memory debug module can generate memory categorization results based on the categorization data stored in the data store.

Figure 5:
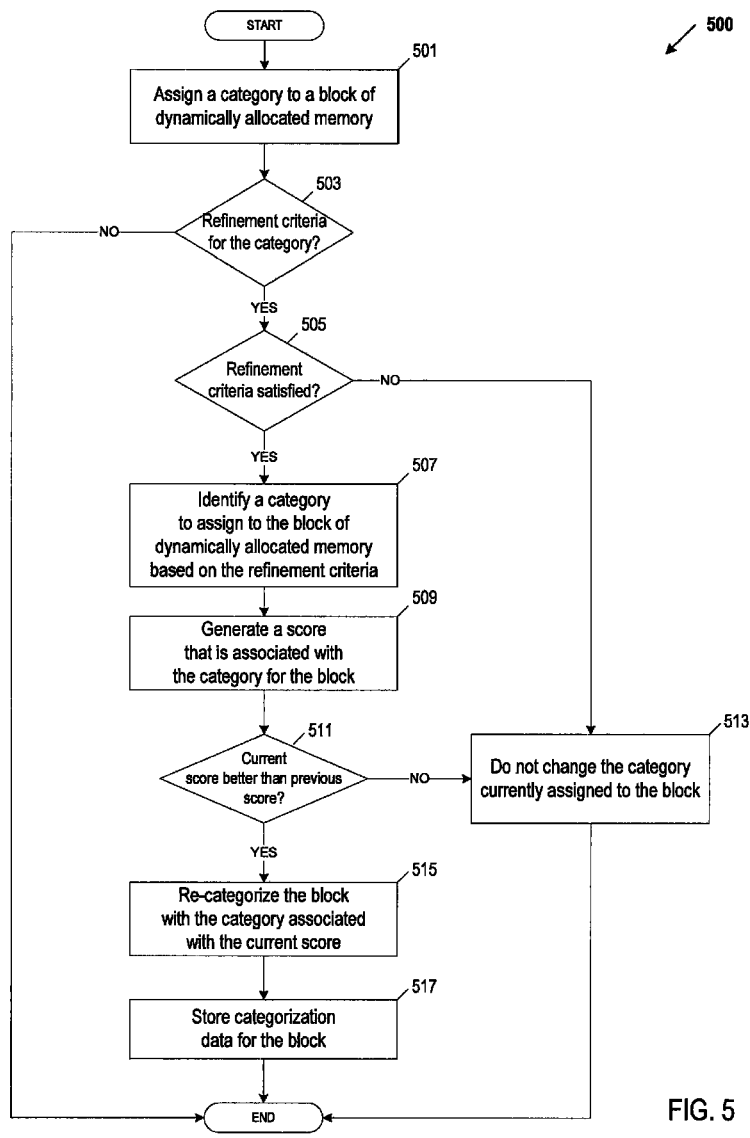
FIG. 5 is a flow diagram of an embodiment of a method for categorizing the dynamically allocated areas of memory using heuristics refinement criteria.

FIG. 5 is a flow diagram of an embodiment of a method 500 for categorizing the dynamically allocated areas of memory using heuristics refinement criteria. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the memory debug module 140 in the programming and debugging system 100 of FIG. 1.

In one embodiment, the method 500 starts with the memory debug module assigning a category and a reliability score to a block of dynamically allocated memory at block 501. At block 503, the memory debug module determines whether refinement criteria for the category exists. For example, with the C programming language, strings are implemented as a series of bytes with a 0 value terminating the sequence. Further refinement criteria for a block that is categorized as a string can be to compare the size of the allocated block with the length of the string, and to reject the categorization if they are not approximately equal. In C code, malloc(strlen(str)+1) will give a dynamically allocated block, but the actual size of this block is typically the length+1 rounded up to some multiple of a constant integer, such as 32.

If there is not refinement criteria for the category (block 503), the method ends. If there is refinement criteria for the category (block 503), the memory debug module analyzes the memory data for the block of dynamically allocated memory to determine whether the block satisfies the refinement criteria at block 505. If the memory data for the block does not satisfy the refinement criteria (block 505), the memory debug module does not change the category that is currently assigned to the block at block 513 according to one embodiment. In another embodiment, the memory debug module rejects the current category that is assigned to the block. For example, if the size of the allocated block is not approximately equal to the length of the string, the memory debug module can reject the 'string' categorization at block 513.

If the memory data for the block satisfies the refinement criteria (block 505), the memory debug module identifies a category to assign to the block of dynamically allocated memory based on the refinement criteria at block 507, according to one embodiment. In one embodiment, the memory debug module confirms the category that is currently assigned to the block. For example, if the size of the allocated block is approximately equal to the length of the string, the memory debug module can confirms the 'string' categorization at block 507. In another embodiment, the memory debug module can refine the category that is assigned to the block based on the satisfied refinement criteria. For example, the heuristics data may include refinement criteria that defines how a Python list is implemented at a machine code level. The memory debug module may initially categorize a block of memory as a Python 'object', determine that the memory data of the block satisfies refinement criteria to re-categorize the Python 'object' as a 'list', a 'dictionary', etc.

At block 509, the memory debug module generates a new heuristics reliability score that is associated with the category for the block. In one embodiment, the reliability score remains the same, such as when the refinement criteria is used to confirm a category (e.g., string category). At block 511, the memory debug module determines whether the current reliability score for the block is better than the previous reliability score of the block. In one embodiment, a better score is the score that has the greater value. If the current reliability score is not better than the previous reliability score, the memory debug module does not change the category currently assigned to the block at block 513. For example, the memory debug module uses the refinement criteria to confirm a current category, such as a string category. If the current reliability score is better than the previous reliability score (block 511), the memory debug module re-categorizes the block with the category that is associated with the current score at block 515. At block 517, the memory debug module stores the category assignment and the reliability score as part of categorization data in the data store.

Figure 6:
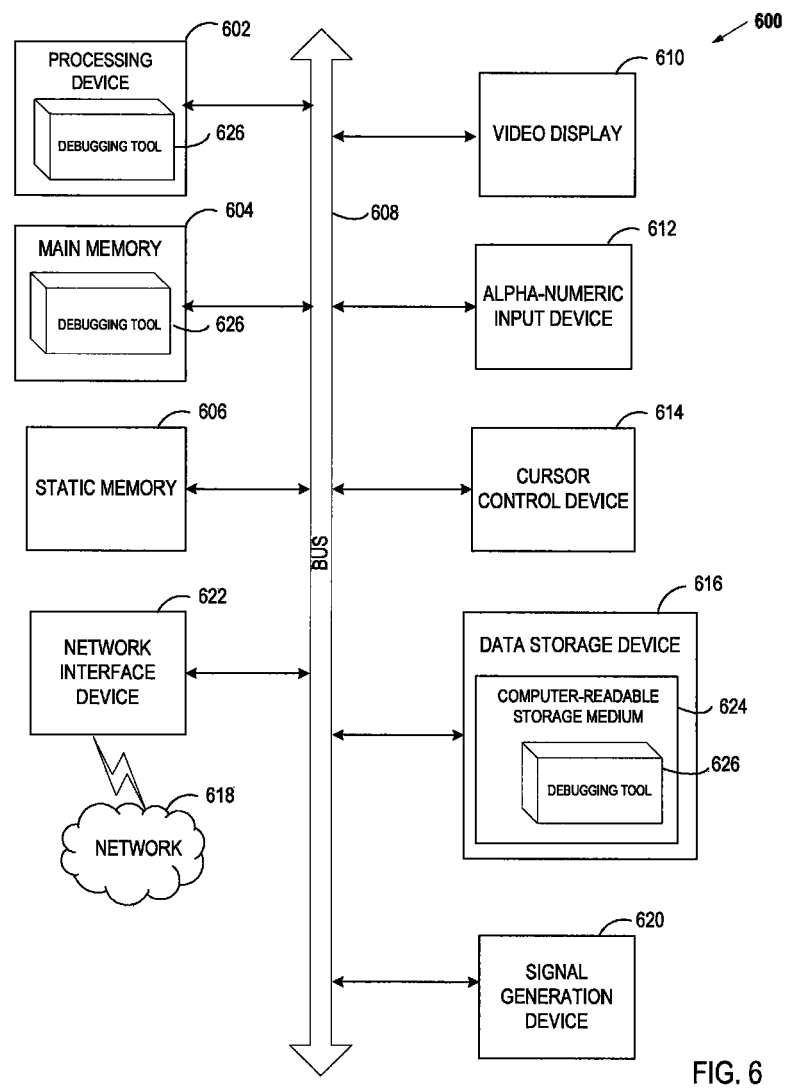
FIG. 6 is a diagram of one embodiment of a computer system for debugging a dynamic memory allocation using heuristics reliability scores.

FIG. 6 is a diagram of one embodiment of a computer system for debugging a dynamic memory allocation using heuristics reliability scores. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the debugging tool 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the debugging tool 626) embodying any one or more of the methodologies or functions described herein. The debugging tool 626 may also reside, completely or at least partially, within the main memory 604 and/or within the processing device 602 during execution thereof by the computer system 600, the main memory 604 and the processing device 602 also constituting machine-readable storage media. The debugging tool 626 may further be transmitted or received over a network 618 via the network interface device 622.

The computer-readable storage medium 624 may also be used to store the debugging tool 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The debugging tool 626, components and other features described herein (for example in relation to FIG. 2) can be implemented as discrete hardware components or integrated in the functionality of hardware components such as ASICS, FPGAs, DSPs or similar devices. In addition, the debugging tool 626 can be implemented as firmware or functional circuitry within hardware devices. Further, the debugging tool 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "identifying," "generating," "categorizing," "re-categorizing," "assigning," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for debugging a dynamic memory allocation using heuristics reliability scores is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   determining, by a computing system, whether memory data pertaining to a block of memory allocated at run-time within an inferior process memory space satisfies one or more criteria in heuristics data, wherein the one or more criteria reflect implementation of a program object at a machine code level;
   identifying a first category to assign to the block of allocated memory based on whether the memory data satisfies the one or more criteria;
   generating a first reliability score for the block of allocated memory indicating a level of reliability of the identified first category; and
   categorizing the block of allocated memory based on a comparison of the first reliability score and a previous reliability score.

2. The method of claim 1, wherein categorizing comprises:
   determining whether the refined reliability score of the block of allocated memory has a greater value compared to the first reliability score of the block of allocated memory; and
   assigning the category that is associated with one of the first reliability score or the refined reliability score that has a greater value to the block of allocated memory.

3. The method of claim 1, further comprising: assigning an initial reliability score to the previous reliability score, the initial reliability score comprising a zero value.

4. The method of claim 1, wherein the one or more criteria are based on at least one of: programming details of implementing at least one data type and an initial word of a block of allocated memory.

5. The method of claim 1, wherein the memory data comprises at least one of: a memory address, an address range of a block of allocated memory, an initial word of a block of allocated memory, a size of a block of allocated memory, data indicating whether a block of allocated memory contains a pointer, an allocator that was used to allocate a block of allocated memory.

6. The method of claim 1, further comprising:
   determining whether the categorized block of allocated memory satisfies refinement criteria;
   identifying a refined category to assign to the block of allocated memory based on the determination of whether the memory data satisfies the refinement criteria;
   generating a refined reliability score for the block of allocated memory; and
   re-categorizing the block of allocated memory based on a determination that the refined reliability score is greater than the first reliability score.

7. The method of claim 6, wherein determining whether the categorized block of allocated memory satisfies refinement criteria comprises:
   determining whether the heuristics data includes refinement criteria associated with the refined category assigned to the block of allocated memory.

8. A system comprising:
   a memory; and
   a processing device coupled to the memory to
      determine whether memory data pertaining to a block of memory allocated at run-time within an inferior process memory space satisfies one or more criteria in heuristics data, wherein the one or more criteria reflect implementation of a program object at a machine code level;
      identify a first category to assign to the block of allocated memory based on whether the memory data satisfies the one or more criteria;
      generate a first reliability score for the block of allocated memory indicating a level of reliability of the identified first category; and
      categorizing the block of allocated memory based on a comparison of the first reliability score and a previous reliability score.

9. The system of claim 8, wherein the processing device is to categorize by: determining whether the refined reliability score of the block of allocated memory has a greater value compared to the first reliability score of the allocated area of memory; and
   assigning the refined category that is associated with one of the first reliability score or the refined reliability score that has a greater value to the block of allocated memory.

10. The system of claim 8, wherein the processing device is further to: assign an initial reliability score to the previous reliability score, the initial reliability score comprising a zero value.

11. The system of claim 8, wherein the one or more criteria are based on at least one of programming details of implementing at least one data type and an initial word of a block of allocated memory.

12. The system of claim 8, wherein the memory data comprises at least one of a memory address, an address range of a block of allocated memory, an initial word of a block of allocated memory, a size of a block of allocated memory, data indicating whether a block of allocated memory contains a pointer, or an allocator that was used to allocate a block of allocated memory.

13. The system of claim 8, wherein the processing device is further to:
   determine whether the categorized block of allocated memory satisfies refinement criteria;
   identify a refined category to assign to the block of allocated memory based on the determination of whether the memory data satisfies the refinement criteria;
   generate a refined reliability score for the block of allocated memory; and
   re-categorize the block of allocated memory based on a determination that the refined reliability score is greater than the first reliability score of the block of allocated memory.

14. The system of claim 13, wherein the processing device is to determine whether the categorized block of allocated memory satisfies refinement criteria by: determining whether the heuristics data includes refinement criteria associated with the refined category assigned to the block of allocated memory.

15. A non-transitory computer-readable storage medium including instructions that, when executed by a computer system, cause the computer system to perform a set of operations comprising:

determining whether memory data pertaining to a block of memory allocated at run-time within an inferior process memory space satisfies one or more criteria in heuristics data, wherein the one or more criteria reflect implementation of a program object at a machine code level;

identifying a first category to assign to the block of allocated memory based on whether the memory data satisfies the one or more criteria;

generating a first reliability score for the block of allocated memory indicating a level of reliability of the identified first category; and categorizing the block of allocated memory based on a comparison of the first reliability score and a previous reliability score.

16. The non-transitory computer-readable storage medium of claim 15, wherein categorizing comprises:

determining whether the refined reliability score of the block of allocated memory has a greater value compared to the first reliability score of the block of allocated area of memory; and assigning the category that is associated with one of the first reliability score or the refined reliability score that has a greater value to the block of allocated memory.

17. The non-transitory computer-readable storage medium of claim 15, further comprising: assigning an initial reliability score to the previous reliability score, the initial reliability score comprising a zero value.

18. The non-transitory computer-readable storage medium of claim 15, wherein the one or more criteria are based on at least one of programming details of implementing at least one data type and an initial word of a block of allocated memory.

19. The non-transitory computer-readable storage medium of claim 15, further comprising:

determining whether the categorized block of allocated memory satisfies refinement criteria;

identifying a refined category to assign to the block of allocated memory based on the determination of whether the memory data satisfies the refinement criteria;

generating a refined reliability score for the block of allocated memory; and re-categorizing the block of allocated memory based on a determination that the refined reliability score is greater than the first reliability score.

20. The non-transitory computer-readable storage medium of claim 19, wherein determining whether the categorized block of allocated memory satisfies refinement criteria comprises: determining whether the heuristics data includes refinement criteria associated with the refined category assigned to the block of allocated memory.

* * * * *